United States Patent
Garrick et al.

(10) Patent No.: US 6,454,242 B1
(45) Date of Patent: Sep. 24, 2002

(54) MODIFIED FLOW THROTTLE BORE

(75) Inventors: Robert David Garrick, Rochester, NY (US); Tracy L. C. Niedzielski, Hudson, MA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/784,363

(22) Filed: Feb. 15, 2001

(51) Int. Cl.[7] ................................................ F02D 9/08
(52) U.S. Cl. ........................ 251/208; 251/305; 123/337
(58) Field of Search ................................. 251/205, 208, 251/305–308; 123/337

(56) References Cited

U.S. PATENT DOCUMENTS

| | | | | |
|---|---|---|---|---|
| 3,298,677 A | * | 1/1967 | Anderson | 251/208 |
| 3,666,235 A | * | 5/1972 | Scott | 251/205 X |
| 3,677,297 A | * | 7/1972 | Walton | 251/305 X |
| 3,809,361 A | * | 5/1974 | Pfundstein et al. | 251/305 X |
| 4,356,801 A | * | 11/1982 | Graham | 123/337 |
| 4,905,647 A | * | 3/1990 | Kizer et al. | 123/337 |
| 5,374,031 A | * | 12/1994 | Semence et al. | 123/337 |
| 5,465,696 A | * | 11/1995 | Gmelin | 123/337 |
| 5,722,366 A | * | 3/1998 | Adachi et al. | 123/337 |
| 5,992,377 A | * | 11/1999 | Dall'Osso et al. | 123/337 |

* cited by examiner

Primary Examiner—Lesley D. Morris
Assistant Examiner—Eric Keasel
(74) Attorney, Agent, or Firm—Patrick M. Griffin

(57) ABSTRACT

An engine air control valve includes a throttle body having an intake air passage and a throttle valve rotatable in the passage between minimum and maximum air flow positions about a valve axis generally perpendicular to the direction of air flow through the passage. The air passage is defined by an internal wall of the throttle body, the wall including a pair of control surfaces spaced from the valve periphery with gradually increasing clearance on opposite sides of the valve axis in a low flow range. At least one of the control surfaces is interrupted by a recess forming a recessed portion of more rapidly increasing clearance extending essentially from a minimum to an intermediate air flow position of the throttle valve. The recess modifies the base flow curve of the throttle body to provide greater air flow over the low flow range of the throttle valve.

5 Claims, 2 Drawing Sheets

MODIFIED FLOW THROTTLE BORE

TECHNICAL FIELD

This invention relates to air control valves or throttle bodies for metering air flow to an internal combustion engine and, more particularly, to a valve with a modified base flow curve.

BACKGROUND OF THE INVENTION

A conventional throttle body may include a bore, a throttle valve, mechanical linkage for actuating the valve, a throttle position sensor and, possibly, and idle air control actuator for accurately controlling air flow during idle operation. In systems having electronic throttle control, the idle air control function may be performed directly by the electronic throttle control, eliminating the idle air control actuator. To obtain the necessary accuracy in positioning and motion of the valve by an electronic throttle actuator, the bore of the throttle body or air control valve may be shaped. For example, spherical shapes may be applied to the bore above and below the valve to provide finer control of air flow in idle and off idle, or low flow, control portions of a range of throttle positions.

For use in automotive and other applications, throttle bodies for engines are commonly made by die casting to the desired bore configuration. Various sizes of throttle bodies may be provided for application to engines having various requirements for maximum air flow. However, for various engine and vehicle applications, different curves of air flow versus throttle position are often desired in throttle bodies of comparable size, that is having the same maximum air flow capacity.

To provide new die casting dies and tooling for each comparable throttle body for which a modified flow curve is desired would require substantial tooling costs that may not be warranted by the volume of production use of the modified bore configuration. Modified throttle bore configurations for varying the base flow curve of air flow versus throttle position for a standard throttle body by simple machining of the die cast bores would therefore be useful in both production and developmental throttle body applications.

SUMMARY OF THE INVENTION

The present invention provides a family of throttle bore configurations modified by machining one or more recesses in a low flow portion of a standard throttle bore. The modified bores provide desired modifications of the throttle body flow curve to meet various application requirements for a particular size, or flow capacity, of a throttle body.

In an exemplary embodiment, a base throttle body is provided with a circular throttle valve rotatable in a range between maximum and minimum air flow positions about a valve axis generally perpendicular to the direction of air flow in a throttle bore or intake passage. In a low flow portion of the range, the passage is defined by a wall having generally spherical control surfaces spaced from the valve periphery with gradually increasing clearance on opposite sides of the valve axis as the valve is opened. In a higher flow portion of the range of throttle valve openings, the valve moves beyond the spherical surfaces to an open bore portion allowing higher air flows, up to a maximum flow.

In accordance with the invention, at least one of the spherical control surfaces is modified by machining into the wall, a recess that interrupts part of the spherical surface. The resulting recessed portion extends from adjacent the minimum air flow position of the valve to an intermediate air flow position at a distal edge of the spherical surface. The recessed portion is of any desired shape suitable for machining and is preferably centered on an axis spaced laterally toward the recessed portion from the throttle valve axis. The recess may be cylindrical, having an outer edge aligned with the internal wall of the throttle body, or passage, at a point laterally opposite the axis of the throttle valve. The size and shape of the recess may be varied. For example, conical, rectangular or other shapes of recesses could be used. The angle of the recess in the bore could also be varied as desired. However, the recess must extend from adjacent the closed throttle position of the valve to modify the full extent of the base air flow curve for the throttle body.

These and other features and advantages of the invention will be more fully understood from the following description of certain specific embodiments of the invention taken together with the accompanying drawings.

DESCRIPTION OF THE PREFERRED EMBODIMENT

Figure 1:
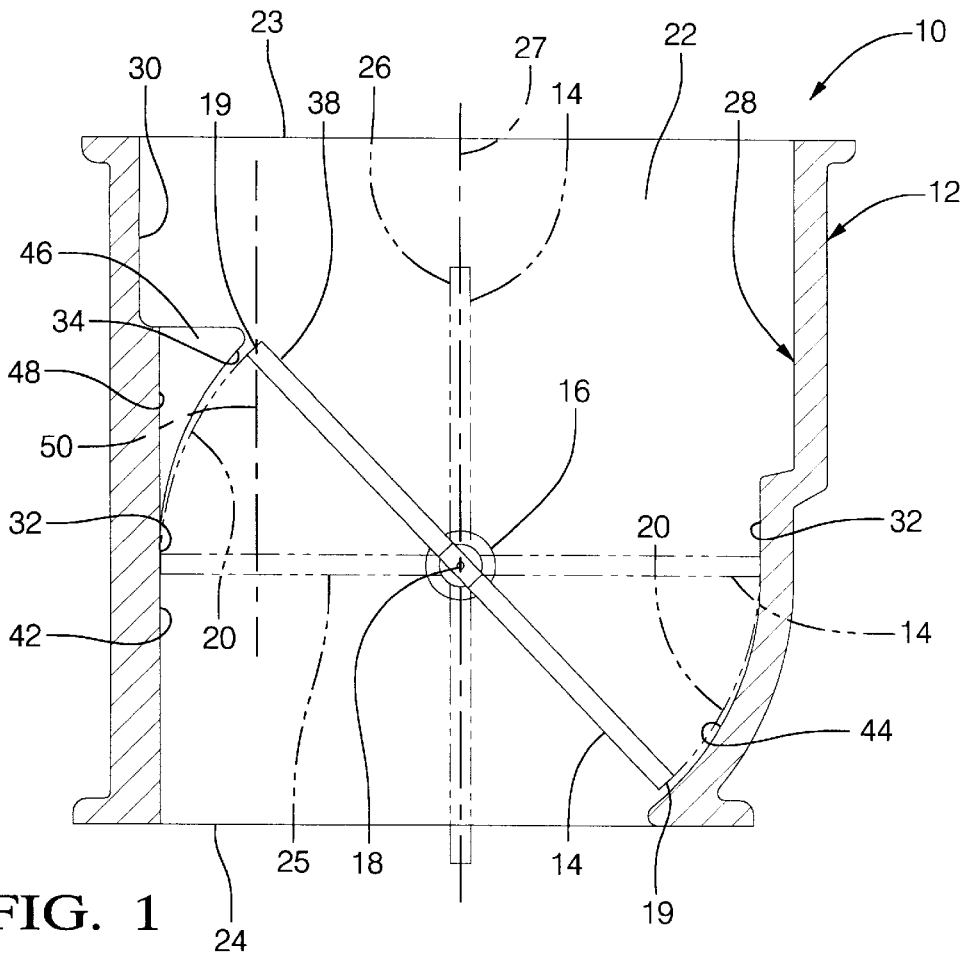
FIG. 1 is a cross-sectional view of an exemplary embodiment of air control valve according to the invention.
Figure 2:
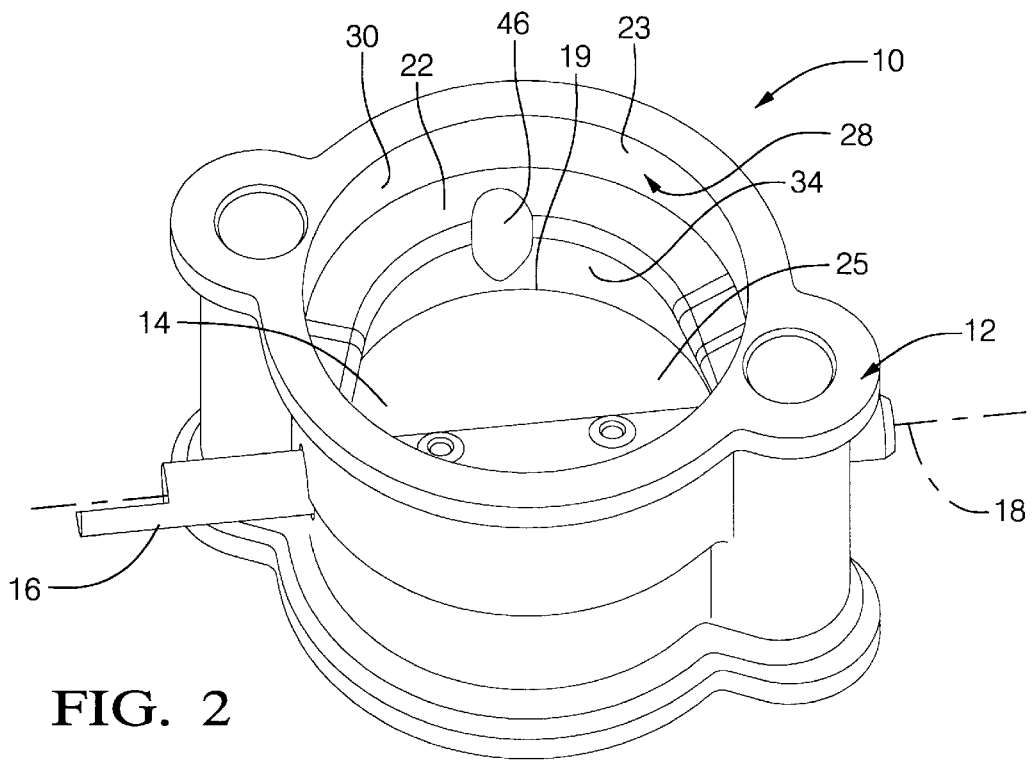
FIG. 2 is a pictorial view into the air passage at an angle from the inlet end.
Figure 3:
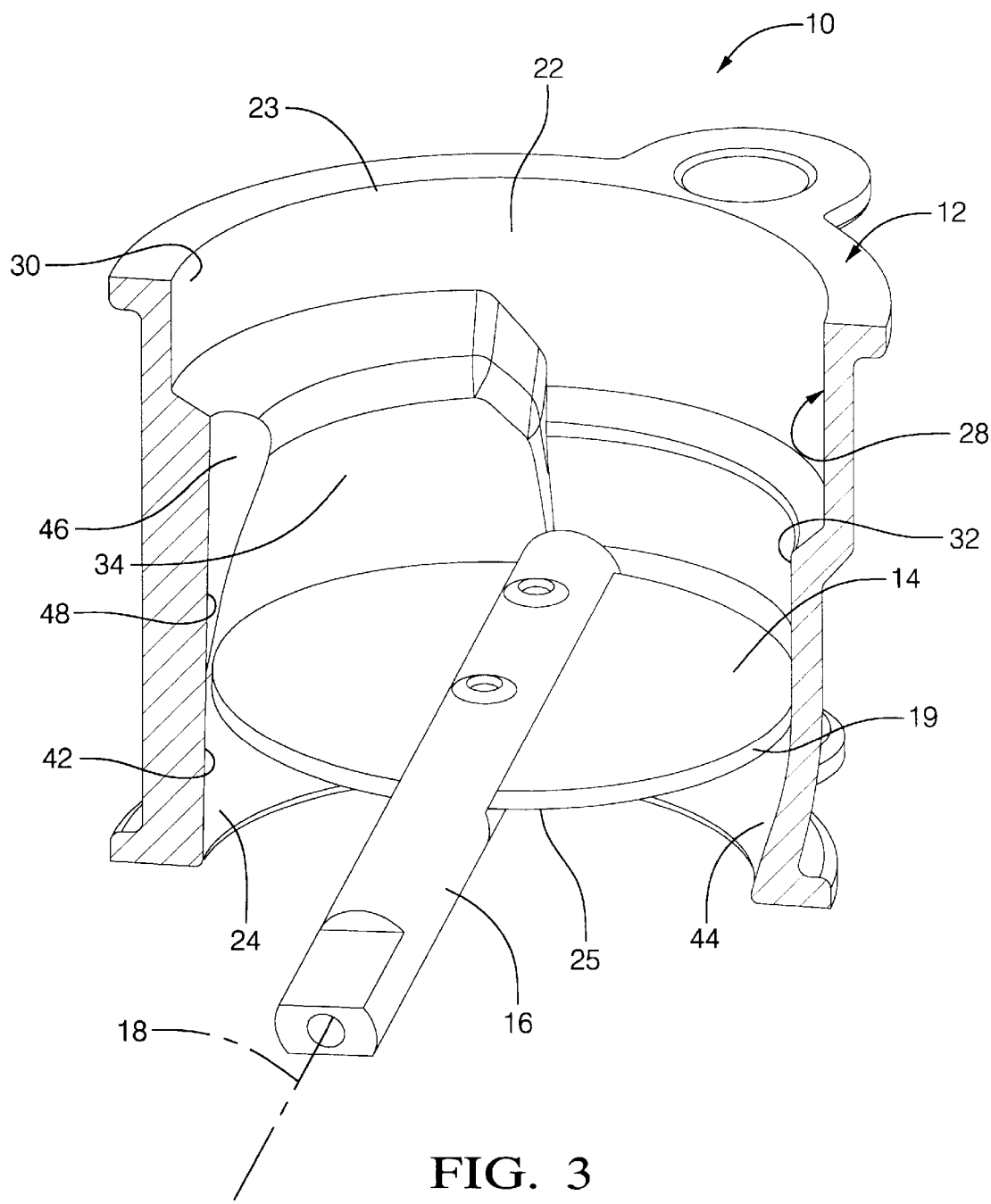
FIG. 3 is a pictorial view with the throttle body sectioned to show the interior of the air passage.

Referring now to the drawings in detail, numeral 10 generally indicates an exemplary embodiment of air control valve (ACV) for use with an internal combustion engine. ACV 10 includes a throttle body 12 and a throttle valve 14 mounted in the throttle body 12 on a throttle shaft 16 for rotational movement on an axis 18 aligned with the shaft. Valve 14 has a periphery 19 movable in an arc 20, as shown in the longitudinal cross section of FIG. 1. Throttle valve 14 is circular, although other valve shapes (e.g. oval, rectangular) may be used.

The throttle body 12 defines an intake air passage 22 through the body, the passage having an inlet end 23 and an outlet end 24. The throttle shaft 16 is supported in the throttle body 12 and carries the throttle valve 14 in the air passage 22 for rotation in a range between minimum and maximum air flow positions 25, 26, shown in dashed lines in FIG. 1. The shaft 16 extends perpendicular to the general direction of air flow through the air passage 22 in the maximum flow position of the throttle valve 14. This general air flow direction is indicated by a longitudinal axis 27 aligned with the throttle valve 14 in the maximum flow position 26.

Air passage 22 is defined by an internal wall 28 of the throttle body 12. Wall 28 includes a generally cylindrical entrance portion 30 connecting with a central portion having a reduced diameter cylindrical portion 32 on one side of the valve axis 18. On an opposite side of the valve axis, a first generally spherical surface 34 forms an upper control portion that extends upward from the cylindrical portion 32, laterally adjacent to the valve axis 18. The spherical surface 34 extends upward with gradually increasing clearance from the periphery 19 of the throttle valve 14 as it rotates from the minimum flow position 25, shown in dashed lines, to an intermediated flow position 38, shown in solid lines in FIG.

1. The maximum flow position 26 of the valve 14 is also shown in dashed lines in the figure, wherein the throttle valve is aligned with axis 27, showing the general direction of air flow through the air passage 22.

Below the valve axis 18, air passage 22 has a cylindrical portion 42 that forms an extension of cylindrical surface 32 on the side of the valve axis 18 below the first spherical surface 34. On the other side of the axis 18 is a second generally spherical surface 34 forming a lower control portion that extends downward with gradually increasing clearance from the throttle valve 14 as it rotates from the minimum flow position 25 to the intermediate flow position 38. The spherical surfaces 34, 44 lie opposite one another so that flow through the air passage 22 is gradually increased as the throttle rotates from the minimum flow position 25 to the intermediate flow position 38.

In accordance with the present invention, a base or standard control valve, as described above, may be modified to change the curve of air flow versus valve position by machining into air passage 22 a "cross drill feature". In the illustrated embodiment, this feature takes the form of a recessed portion formed by a cylindrical recess 46. The recess has an outer edge 48 that extends upward in alignment with the lower cylindrical portion 42, which extends from laterally opposite the valve axis 18 downward below the first spherical surface. The recess 46 may be centered on a bypass axis 50 spaced outward of the valve axis 18, in particular spaced laterally toward the recessed portion from the valve axis. As shown, the cylindrical recess 46 has a relatively small radius and forms a bypass flow path beginning at a point adjacent the closed (minimum air flow) position 25 of the throttle valve 14. The recess 46 then increases in cross section as it extends upward to the top of the first spherical surface 34.

The form of the recess 46 shown is exemplary only since the invention contemplates recesses of various forms and configurations within the scope of the claims that follow. Thus, the recess may be of oval, rectangular or other shape instead of cylindrical. The angle of the recess, or its central axis 50, may vary from the direction of the air flow shown in the example. The size of the recess may also be chosen to provide the desired change in the air flow versus throttle position relationship. However, to vary the base flow curve, the recess should begin adjacent the minimum air flow position 25 of the throttle valve and increase in clearance or cross sectional area up to the intermediate air flow position 38 of the valve. Also, the radius of the curved sided recesses, such as the cylindrical recess 46 illustrated, will be less than the air passage radius so that the cross drill feature remains localized in the associated spherical surface 34. If desired, more than one cross drill could be used in the upper spherical surface. Other forms of non-cylindrical surfaces may also be substituted for one or both of the spherical surfaces of the example. The controlling recess or recesses could alternatively be formed in the second (lower) spherical surface 44 instead of or in addition to the first (upper) surface 34.

Thus, while the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An air control valve for metering air to an internal combustion engine and comprising:

a throttle body having an intake air passage extending therethrough;

a throttle valve rotatably mounted in the passage, said throttle valve rotatable within a range between minimum and maximum air flow positions about a valve axis, said range of valve rotation including a low flow portion extending from the minimum air flow position to an intermediate air flow position, said throttle valve having a periphery movable in an arc centered on the valve axis;

said air passage defined by an internal wall of the throttle body having a pair of control surfaces spaced from the throttle valve periphery with gradually increasing clearance on opposite sides of the valve axis in the low flow range from the minimum air flow position to the intermediate air flow position of the throttle valve; and at least one of said control surfaces being interrupted by a recessed portion of more rapidly increasing clearance extending from adjacent the minimum to the intermediate air flow position of the throttle valve.

2. An air control valve as in claim 1 wherein said recessed portion is centered on an axis spaced laterally toward the recessed portion from the valve axis.

3. An air control valve as in claim 2 wherein the recessed portion is part cylindrical.

4. An air control valve as in claim 2 wherein the throttle valve is circular and an outer edge of the recessed portion is aligned with the internal wall of the throttle body at a point laterally opposite the axis of the throttle valve.

5. An air control valve as in claim 4 wherein the at least one of said control surfaces is spherical.

* * * * *